US012421026B2

(12) United States Patent
Young et al.

(10) Patent No.: US 12,421,026 B2
(45) Date of Patent: Sep. 23, 2025

(54) TRASH BIN DOLLY SYSTEM

(71) Applicant: CFS Brands, LLC, Oklahoma City, OK (US)

(72) Inventors: Michael Young, Mukwonago, WI (US); Tim Larson, Montrose, CO (US); Tyler Jenne, Guthrie, OK (US)

(73) Assignee: CFS Brands, LLC, Oklahoma City, OK (US)

( * ) Notice: Subject to any disclaimer, the term of this patent is extended or adjusted under 35 U.S.C. 154(b) by 324 days.

(21) Appl. No.: 17/942,831

(22) Filed: Sep. 12, 2022

(65) Prior Publication Data

US 2023/0081484 A1 Mar. 16, 2023

Related U.S. Application Data

(60) Provisional application No. 63/261,172, filed on Sep. 14, 2021.

(51) Int. Cl.
*B65F 1/14* (2006.01)

(52) U.S. Cl.
CPC .................................. *B65F 1/1473* (2013.01)

(58) Field of Classification Search
CPC ..................................................... B65F 1/1473
See application file for complete search history.

(56) References Cited

U.S. PATENT DOCUMENTS 3,031,207 A 4/1962 Bard
3,831,959 A 8/1974 Fontana
4,103,919 A 8/1978 Greenheck
D251,833 S * 5/1979 Maza ............................. D34/23
5,052,703 A 10/1991 Bertrand
5,074,572 A * 12/1991 Delmerico ............ B65F 1/1468 280/79.5
5,110,147 A 5/1992 Gershman
D327,557 S 6/1992 Juergens
D328,172 S 7/1992 Juergens
5,184,836 A * 2/1993 Andrews, Jr. ............. B62B 3/08 D9/425

(Continued)

FOREIGN PATENT DOCUMENTS

AT 401767 B 9/1990
CA 2974173 A1 7/2017

(Continued)

*Primary Examiner* — Erez Gurari
(74) *Attorney, Agent, or Firm* — Boyle Fredrickson, S.C.; Kirk L. Deheck; Adam L. Brookman

(57) ABSTRACT

A dolly system that is constructed to removeably cooperate with bulk material can(s) or bin(s) to facilitate convenient transport thereof. The dolly system includes a base having a plurality of caster wheels. A bin facing side of the base includes a boss and one or more threads that are shaped to index a respective material bin relative to the base and restrict axial translation therebetween. A catch is defined by the base and engages the bin to resist opposite rotational translation therebetween. The dolly system can include an optional brake assembly supported by the base and selectively operable to resist translation and/or tipping of the dolly system and one or more optional connection brackets for selectively connecting a plurality of discrete dollies and respective bins relative to one another.

13 Claims, 10 Drawing Sheets

(56) References Cited

U.S. PATENT DOCUMENTS

| | | | | |
|---|---|---|---|---|
| 5,235,325 | A * | 8/1993 | McCaughan, Jr. | H01H 35/006 340/693.5 |
| 5,295,606 | A | 3/1994 | Karwoski | |
| D349,995 | S * | 8/1994 | Cassel | D34/27 |
| 5,358,138 | A | 10/1994 | Karwoski | |
| D378,154 | S | 2/1997 | Presnell | |
| 5,758,888 | A * | 6/1998 | Burgan | B65F 1/14 280/79.5 |
| 5,860,659 | A | 1/1999 | Hart | |
| 5,901,872 | A | 5/1999 | Zollinhfer et al. | |
| 6,095,537 | A | 8/2000 | Cozza et al. | |
| D460,236 | S * | 7/2002 | Perelli | D34/23 |
| 6,746,039 | B2 * | 6/2004 | Perelli | B65F 1/1473 280/651 |
| 6,749,215 | B2 | 6/2004 | Perelli et al. | |
| 6,866,274 | B1 | 3/2005 | Muscat | |
| 6,893,032 | B2 | 5/2005 | Kershaw | |
| 6,964,423 | B1 | 11/2005 | Chieh et al. | |
| D549,920 | S * | 8/2007 | Dukes | D34/23 |
| D551,823 | S * | 9/2007 | Wentz | D34/23 |
| 7,427,076 | B2 | 9/2008 | Gwin | |
| 7,648,147 | B2 | 1/2010 | Lauer et al. | |
| 8,256,778 | B1 * | 9/2012 | Morad | A47L 13/58 280/47.35 |
| 8,376,376 | B2 * | 2/2013 | Thibault | B08B 1/52 280/79.5 |
| 8,448,812 | B2 * | 5/2013 | Gruber | B65F 1/122 220/636 |
| 8,646,384 | B1 * | 2/2014 | Moglia | B65F 1/16 100/59 |
| 9,188,476 | B2 * | 11/2015 | Volker | B01D 61/04 |
| 9,266,548 | B1 | 2/2016 | Morad et al. | |
| 9,988,172 | B2 | 6/2018 | Ristoski | |
| 10,046,910 | B2 | 8/2018 | Wagner et al. | |
| 10,850,920 | B1 * | 12/2020 | Allen | B62B 5/0093 |
| 2009/0026721 | A1 | 1/2009 | Martinez | |
| 2010/0230920 | A1 | 9/2010 | Thibault | |
| 2012/0286486 | A1 * | 11/2012 | Varney | B65F 1/1473 280/47.11 |
| 2014/0265194 | A1 | 9/2014 | Gwin | |
| 2014/0318876 | A1 * | 10/2014 | Kellams | G01G 19/08 177/45 |
| 2016/0356640 | A1 * | 12/2016 | Freeman | G08B 21/182 |
| 2017/0029207 | A1 * | 2/2017 | Starkey | G08B 21/24 |
| 2017/0113826 | A1 | 4/2017 | Ristoski | |
| 2017/0158427 | A1 * | 6/2017 | Dafoe | B62B 3/02 |
| 2018/0022544 | A1 * | 1/2018 | Donnelly | B65F 1/1468 220/605 |
| 2023/0081484 | A1 * | 3/2023 | Young | B65F 1/1473 280/47.26 |
| 2024/0367898 | A1 * | 11/2024 | Singh | B65F 1/1615 |

FOREIGN PATENT DOCUMENTS

| | | | |
|---|---|---|---|
| CN | 101362464 | B | 6/2008 |
| EP | 1841634 | A2 | 10/2007 |
| EP | 2103491 | B1 | 3/2009 |
| EP | 3759006 | A2 | 1/2021 |
| FI | 20185193 | A1 | 3/2018 |
| FR | 2659633 | A1 | 9/1991 |
| GB | 2309673 | A | 8/1997 |
| GB | 2316660 | A | 3/1998 |
| JP | 2014117961 | A | 6/2014 |
| WO | 2000005122 | | 2/2000 |

* cited by examiner

TRASH BIN DOLLY SYSTEM

CROSS-REFERENCE TO RELATED APPLICATIONS

This application claims priority to U.S. Provisional Patent Application Ser. No. 63/261,172 filed on Sep. 14, 2021 titled "TRASH BIN DOLLY SYSTEM" the disclosure of which is expressly incorporated herein.

FIELD OF THE INVENTION

The present invention relates to a dolly system useable for transporting garbage cans, trash bins, bulk food ingredient bins, or the like, and more particularly, to a dolly system that is constructed to cooperate with respective bulk material bins in a manner that mitigates inadvertent or unintended separation between discrete bins and a respective underlying dolly, can include an optional brake system that allows more forceful interaction with the respective bin and dolly assembly without effectuating translation the bin and dolly relative to a floor surface, and is constructed to accommodate securing of the dolly assembly to additional dolly assemblies and/or other structures, such as janitorial carts or the like, to improve transportation of one or more dolly assemblies and associated bulk material bins through tight quarters.

BACKGROUND OF THE INVENTION

A number of environments require the periodic conveyance of bulk materials or trash or refuse storage or transport containers to various areas associated with remote collection of such materials. For purposes of this disclosure, and for ease of reference, transport of bulk materials or garbage or trash bins will be used by way of example. However, this is not meant to limit the application of the present invention to trash or any other particular bulk collection or transport container or storage or transport therefor.

Commonly, commercial food and beverage, hospitality, and educational environments require the periodic collection of trash or other refuse from more rigidly fixed trash collection structures. Janitorial staff commonly travel about the respective environments and collect trash or other refuse collected in common areas such as food courts, class or hotel rooms, concession areas or the like and transport the collected refuse to disposal sites such as dumpsters or the like. Transportation of the waste collection containers requires transport of the bulk containers in a manner that limits or reduces unintended spills or separation of the containers from an underlying dolly, and conveying the containers in a convenient manner to limit the physical requirements or efforts of staff responsible for collecting and disposing of the trash. The movement of bulk trash collection containers in such environments also commonly requires consideration as to the storage and movement of the containers and dollies throughout the respective environments due to the limited space available in behind-the-scenes areas, such doorways as well as janitorial closets or the like, associated with many such environments. Considerations similar to those above also relate to the transport of bulk ingredients in multiple environments wherein manual carried transport of larger volumes of cooking and/or baking materials can be arduous or difficult for service or staff personnel.

Most commonly, bulk material transport, such as trash collection operations, are effectuated by the transporting of the discrete collection bins throughout the environment by staff personnel who repeatedly travel to and from between bulk trash sources or storage areas and the vicinity of the trash generation. The size of the trash bins, the physical capability of staff, spatial tolerances along the available route(s), and the rate of trash generation all contribute to the number of trips as well as staff required to adequately effectuate the trash removal and cleaning activities. Such considerations are equally germane to the transport of bulk dry and/or wet food stuff materials between storage locations and cooking or baking locations and/or subsequent cooking, baking, and storing operations.

In an effort to expedite transportation throughout the respective environments and mitigate or reduce the physical capabilities required to effectuate such activities, others provide wheeled carts or dollies that are configured to transport multiple bins per trip. While such systems allow a single staff person to transport greater quantities of materials than can commonly by carried by the same staff person, such systems are not without their respective drawbacks. One such system includes a wheeled platform that is shaped to cooperate with a plurality of discrete containers or carts but such methodologies commonly only allow transport of a single bulk container are/or have been found to be somewhat unwieldable as the janitorial and/or kitchen staff personal traverse the respective environments. That is, such systems are susceptible to tipping and/or undesired and unanticipated separation between the bins and the underlying rolling transport device due to the various manipulations of the device assembly during transit throughout the working environment and user interaction therewith during the respective collection and/or transport operations.

Still further, such systems are susceptible to non-assisted translation of the transport devices during user inaction therewith. That is, personnel interacting with the bulk transport devices tend to move during loading and/or dumping operations which can result in the undesired spillage of the contents associated with the bulk material bins to areas surrounding the bulk transport device. To resolve such shortcomings, others provide bulk material transport devices that are provided in relatively large footprint assemblies thereby rendering the dolly and associated bin ill-suited or even unusable for use in the somewhat cramped quarters or passages associated with many behind the scenes areas, such as doorways of janitorial spaces, kitchen areas, or the like, associated with such environments. Still further, when used for cleaning operations, such operations commonly require the transport of both a bulk trash collection device as well as cleaning supplies attenuate to the cleaning operations. Concurrent transportation of multiple discrete and independently movable rollable devices detracts from efficient utilization of the time and energy of personnel during discrete service events.

In view of the variety of shortcomings discussed above, there is a need for a bulk material bin transport device that provides a robust and secure, but readily manually severable, connection methodology between the discrete bins and the underlying transport dolly. In certain circumstances, there is also a need for a bulk material bin transport assembly that can be quickly and expeditiously converted between freely moveable operation and a generally non-movable operation when desired. There is a further need for a bulk material bin transport assembly that allows for the selective concurrent transport of multiple rolling devices to improve the efficiency, sanitation, and safety with which staff or other personnel can convey respective bulk material bin assemblies throughout a respective environment.

SUMMARY OF THE INVENTION

The present invention discloses a bulk material bin dolly system or dolly assembly that overcomes one or more of the drawbacks mentioned above. The dolly system is constructed to removeably cooperate with a bulk material bin to facilitate convenient rolling transport of the bin associated therewith. The dolly system includes a base having a plurality of caster wheels connected thereto. A bin facing side of the base includes a boss and one or more threads that are shaped to index a respective bulk material bin relative to the base and, when engaged with one another, restrict axial translation between the bin and the base, respectively. A moveable catch is provided between the base and the bin associated therewith and is operable to resist inadvertent opposite rotational translation between the bin and the base. In a preferred aspect, an optional actuator or brake assembly is connected to the base and is moveable between a stowed position and an engaged position. When in the engaged position, the optional actuator assembly resists translation and/or tipping of the assembly relative to a floor surface. In a preferred aspect, the dolly assembly includes an optional bracket or connector rod that is constructed to secure multiple dollies to one another to facilitate convenient concurrent transport of multiple bins.

Another aspect of the present application disclosed a bulk material bin dolly system having a base that includes an upward facing surface and a floor facing surface. A plurality of caster wheels are engaged with the base and extend away from the floor facing surface of the base. A boss extends from the upward facing surface of the base and at least one thread section extends in a radial direction from a sidewall of the boss. The thread section is constructed to cooperate with a thread section defined by a bulk material bin and configured to resist axial translation between the base and the bin when the bin is engaged with the base. At least one catch is defined by the base and is offset in a radial direction from the boss. The at least one catch is constructed to engage a toothed interface defined by the bin when the boss is engaged therewith so that cooperation of the at least catch and the toothed interface resists inadvertent or unintended rotation of the respective bin relative to the base when the bin is engaged therewith.

A further aspect of the application discloses a material bin dolly assembly that includes a base having a plurality of caster wheels attached to a floor facing side of the base. A hub extends in an upward direction from a bin facing side of the base. At least one ridge extends in an outward radial direction from the hub such that a first end of the at least one ridge is nearer a top surface of the hub than a second end of the at least one ridge. The assembly includes a connector bracket that removeably cooperates with the base and extends in an outward direction therefrom beyond a perimeter of the base when connected to the base such that a free end of the connector bracket can be selectively secured to another base. In a further aspect, the material bin dolly assembly includes an optional brake bracket that extends in a downward direction from the base and an actuator or support that is connected to a downwardly extending end of the brake bracket and is movably connected thereto such that the support can move between a first position wherein the support engages a floor, and/or is oriented to be stepped upon by a user, and a second position wherein the support extends along a portion of the bracket that is offset from the floor surface.

Another aspect of the present application discloses a method of forming a bulk material bin dolly assembly that includes providing a base and forming a hub on a bin facing side of the base. A partial thread is formed on a radially outward facing side of the hub so that a bin can be removeably engaged with the base and partially rotated in a first direction relative to the base to engage the partial thread to restrict axial movement of the bin relative to the base. A catch is also formed between the base and the bin so that the catch can deflect in an axial direction during rotation of the bin relative to the base and is operable to resist rotation of the bin in a second direction opposite the first direction.

Various other aspects, objects, features, and advantages of the application will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications. Other features, objects, aspects, and advantages of the invention made apparent from the following description taken together with the drawings. It is further appreciated that the various features, aspects, objects, and advantages disclosed above are not mutually exclusive to the specific aspects of the invention such that the various discrete features, aspects, objects, and advantages are usable and/or combinable with other another.

BRIEF DESCRIPTION OF THE DRAWINGS

The drawings illustrate the best mode presently contemplated of carrying out the invention.

In the drawings.

DETAILED DESCRIPTION OF PARTICULAR EMBODIMENTS

Figure 1:
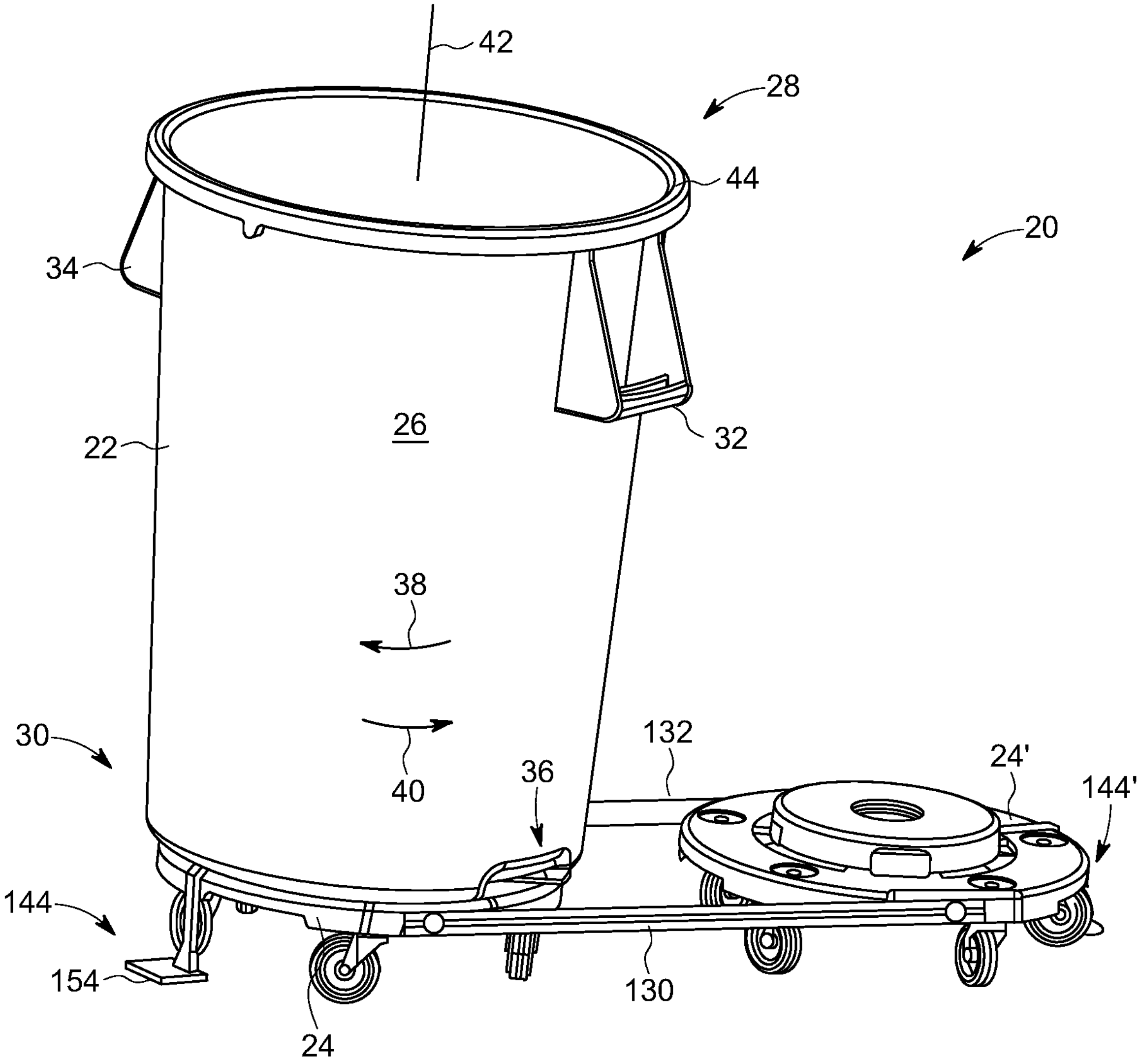
FIG. 1 is a top front side perspective view of a bulk material bin dolly assembly or system according to one embodiment of the present invention and having an exemplary bulk material bin or container in the form of a trash bin engaged with one of a connected pair of two respective bin dolly assemblies.

FIG. 1 is a perspective view of a bulk material bin assembly or bulk material bin transport assembly or system 20 according to the present invention and having a respective exemplary bulk material bin 22, such as a garbage or refuse, or bin engaged therewith. Transport system 20 includes at least one dolly system or assembly 24 according to a first embodiment of the invention such that dolly assembly 24 is preferably constructed to allow connection of additional similarly constructed dolly assemblies 24' and/or the connection of one or more dolly assemblies 24, 24' to one another and/or to ancillary transport devices such as janitorial carts or the like. Whether deployed for individual or multiple use, each respective dolly assembly 24, 24' is constructed to selectively removably cooperate with a discrete material bin 22. It should be further appreciated that dolly assembly 24 and dolly assembly 24' have the same construction such that, when isolated, the same are indistinguishable from one another.

Bulk material bin 22 is defined by a body 26 that extends between an upper end 28 and a lower end 30 that is constructed to removably cooperate with a respective underlying dolly assembly 24, 24'. Depending upon the shape, size, and commodity intended to be contained therein, body 26 of bin 22 preferably includes one or more handles 32, 34 positioned proximate upper end 28 and one or more grip sites 36 disposed proximate a lower or dolly facing end 30. It is further appreciated that bin 22 may include a selectively openable lid or cover and/or a removable lid or cover associated with selectively closing the opening associated with the upper end 28 thereof depending upon the intended use and/or the contents intended to be disposed within bin 22. The relative orientation and construction of optional handles 32, 34 and/or optional grip sites 36 facilitates convenient ergonomic user interaction with bin 22 during association and/or disassociation of bin 22 relative to an underlying dolly assembly 24 as well as during transport and/or dumping operations thereof. As disclosed further below with respect to FIGS. 8-10, bin 22 is constructed to be selectively rotated, as indicated by arrows 38, 40, about a longitudinal axis 42 of body 26 relative to an underlying dolly assembly 24, 24', or a dolly assembly such as dolly assemblies 200, 200' shown in FIGS. 9 and 10 as disclosed further below, so as to effectuate the desired secure interaction therebetween and/or the removal therefrom. When engaged with a respective dolly assembly 24, 24', it should be appreciated that user interaction with one or more of handles 32, 34 and/or a rim 44 defined by body 26 of trash bin 22 may be utilized to effectuate efficient manual rolling translation of transport system 20 during use thereof and concurrent translation of any additional dolly assemblies 24' associated therewith as disclosed further below.

Figure 2:
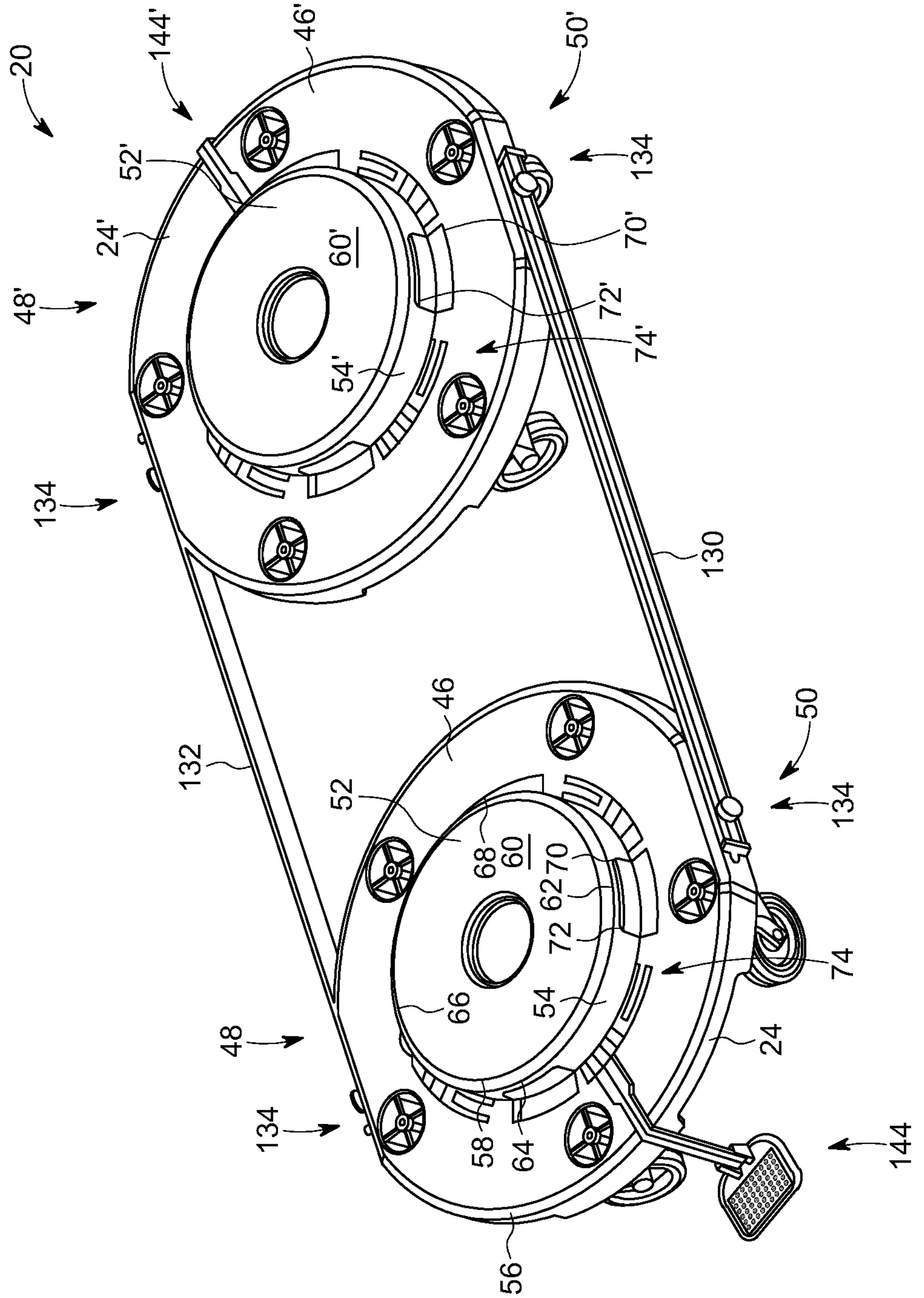
FIG. 2 is perspective view of the bin dolly system shown in FIG. 1 with the exemplary bin removed therefrom.
Figure 3:
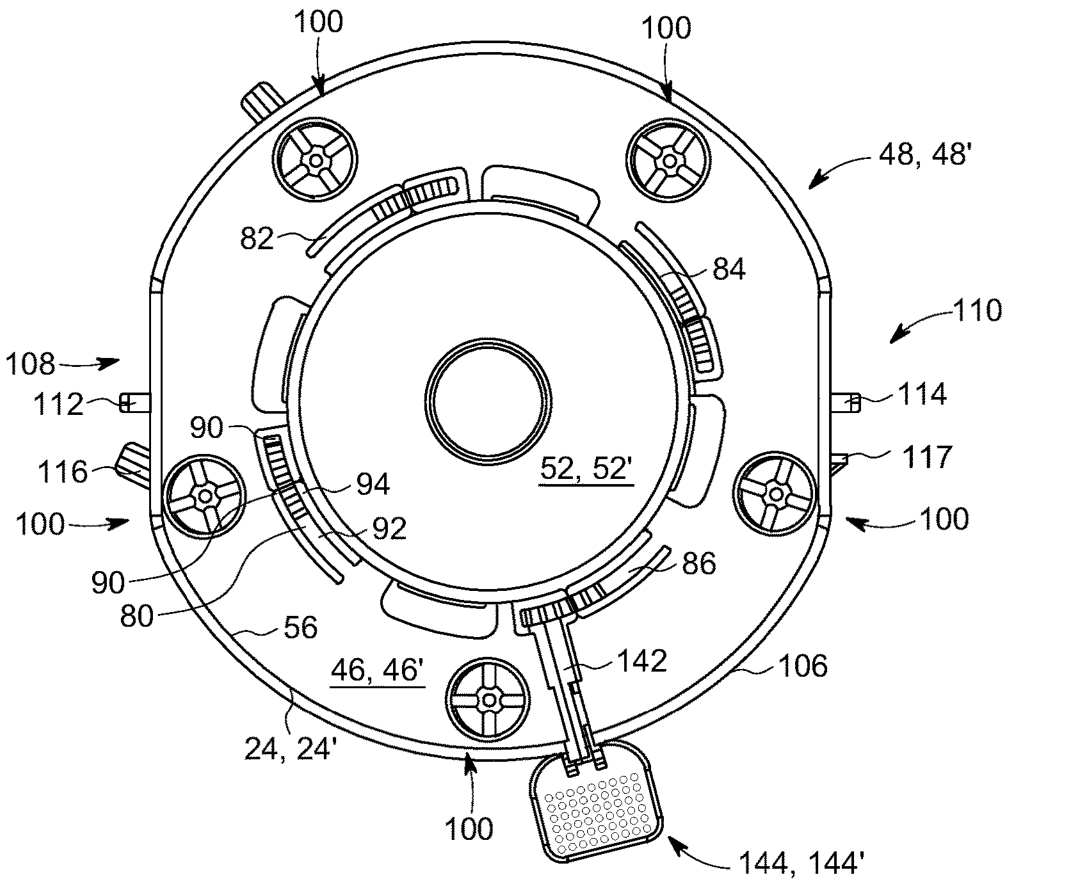
FIG. 3 is a top plan view of one of the bin dolly assemblies shown in FIG. 1.
Figure 4:
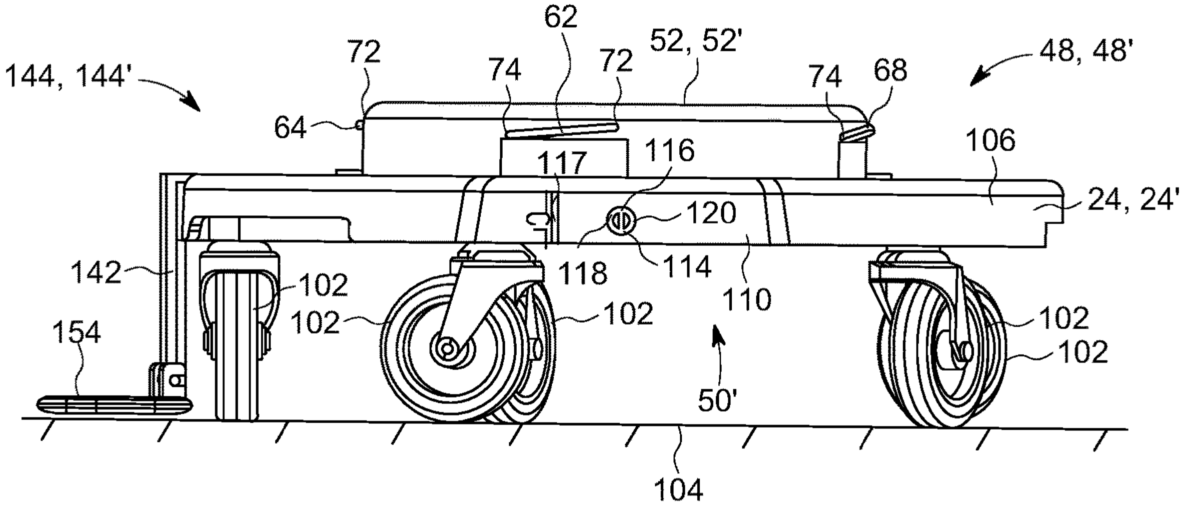
FIG. 4 is a side elevation view of the bin dolly assembly shown in FIG. 3.

Referring to FIGS. 2-4, each dolly assembly 24, 24' includes a body or base 46, 46' that defines an upper or bin facing surface 48, 48' and a lower or floor facing surface 50, 50' that each extend along the opposite sides thereof. Bin facing surface 48, 48' includes a projection or a boss 52, 52' that is generally centrally disposed relative to bin facing surface 48, 48'. Boss 52, 52' includes an upstanding wall 54, 54' formed between a perimeter 56, 56' of bin facing surface 48, 48' and a perimeter 58, 58' associated with a top surface 60, 60' of projection 52, 52'. One or more projections or thread portions 62, 64, 66, 68 extend in an outward radial direction from the upstanding wall 54, 54' associated with each respective boss 52, 52'. Although four thread sections or portions are shown, it is appreciated that bosses 52, 52' could be provided with other numbers of thread portions. As disclosed further below with respect to FIG. 8, respective gaps 74, 74' are formed between adjacent respective thread portions 62, 64, 66, 68 and configured to allow axial translation of bin 22 along axis 42 during association and disassociation of bin 22 relative to a respective dolly assembly 24, 24'. A respective first end 70 of each respective thread portions 62, 64, 66, 68 is nearer top surface 60 of respective boss 52, 52' than an opposing end 72 of the corresponding thread portion 62, 64, 66, 68 such that, as disclosed further below, rotational interaction of bin 22 with thread portions 62, 64, 66, 68 effectuates axial biasing of bin 22 toward a respective underlying dolly assembly 24, 24'.

As shown in FIG. 3, each dolly assembly 24, 24' includes one or more catches 80, 82, 84, 86 that are defined by the respective base 46, 46'. Each catch 80, 82, 84, 86 is located radially outboard relative to side wall 54 of the respective boss 52, 52' and includes one or more teeth 90 that extend in an upward axial direction relative to the respective base 46, 46'. Catches 80 are defined by an elongate arm 92 that extends in a cantilevered manner so as to be deflectable in an axial direction aligned with axis 42 during association and disassociation of a respective bin 22 with the underlying dolly assembly 24, 24'. A gap 94 is defined in base 46, 46' to generally circumscribe the cantilevered portion of arm 92. Respective catches, 80, 82, 84, 86 are generally radially aligned with respective gaps 74 between adjacent respective thread portions 62, 64, 66, 68 defined by respective dolly assemblies 24, 24'.

A plurality of caster bosses 100 are defined by each of respective bases 46, 46' of each of dolly assemblies 24, 24'. Caster bosses 100 are disposed radially inboard and circumferentially dispersed about a perimeter 56 of each of bases 46, 46'. Respective caster wheel assemblies 102 preferably snap-fittingly cooperate with respective caster bosses 100 such that the wheels associated with each caster assembly extends from the respective floor facing surface 50, 50' defined by the corresponding base 46, 46' and engage the underlying floor 104. Each caster wheel assembly 102 is preferably 360° rotational relative to discrete axis that are aligned with axis 42 when the discrete wheels are engaged with floor surface 104 to facilitate convenient transport of the respective dolly assemblies 24, 24' and the bin or bins 22 associated therewith. It is however appreciated that one or more of caster wheel assemblies 102 may be provided in a fixed rotational orientation so as to define a generally linear direction of travel of respective dolly assemblies 24, 24' when desired. It is further appreciated that one or more of caster wheel assemblies 102 may be provided with a lockable/unlockable functionality for those applications wherein it is desired to periodically fix the relative position of the respective bases 46, 46' relative to a floor surface.

Figure 6:
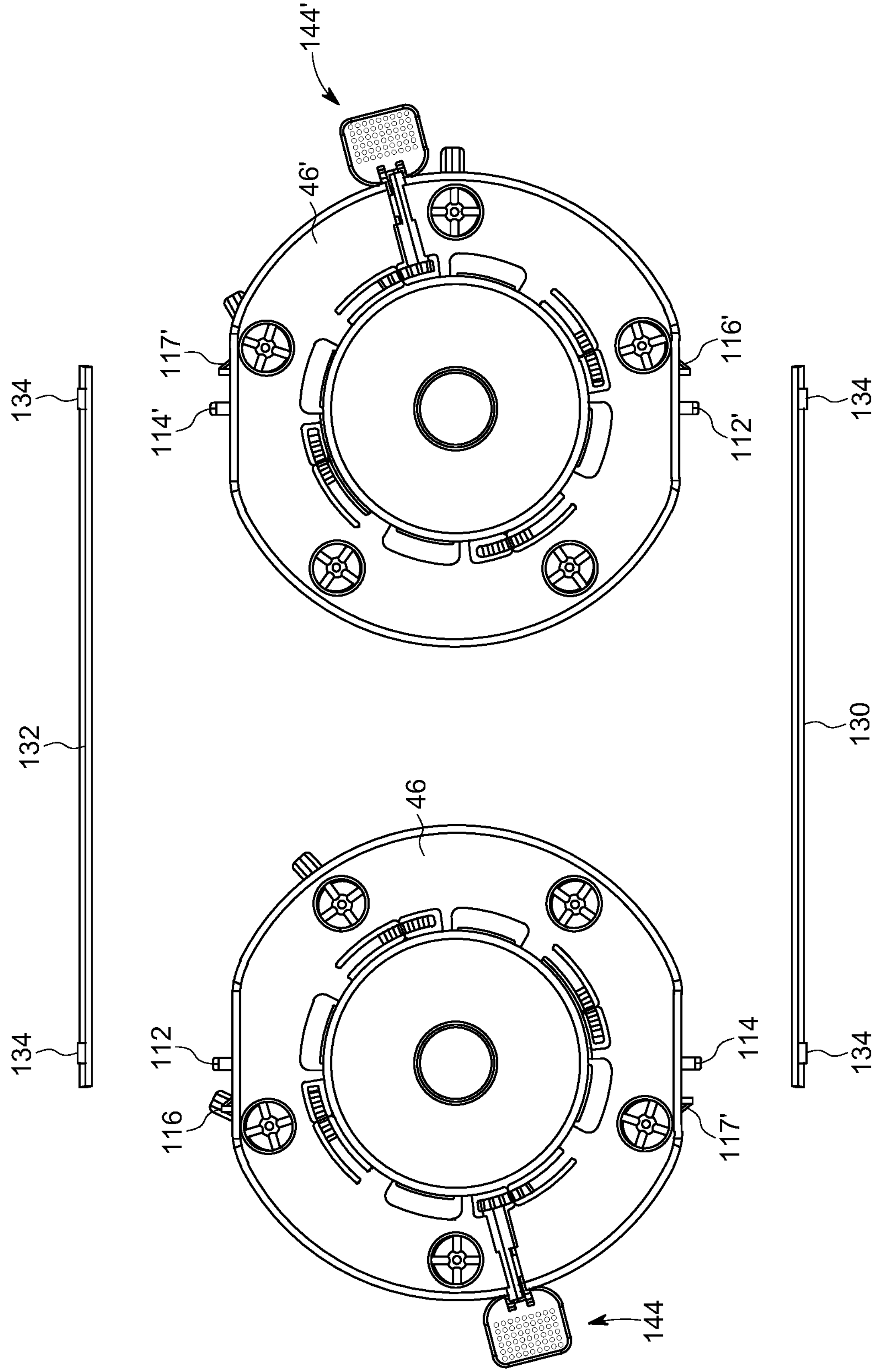
FIG. 6 is a top plan view of the bin dolly system shown in FIG. 1 with a pair of connection brackets exploded therefrom.
Figure 7:
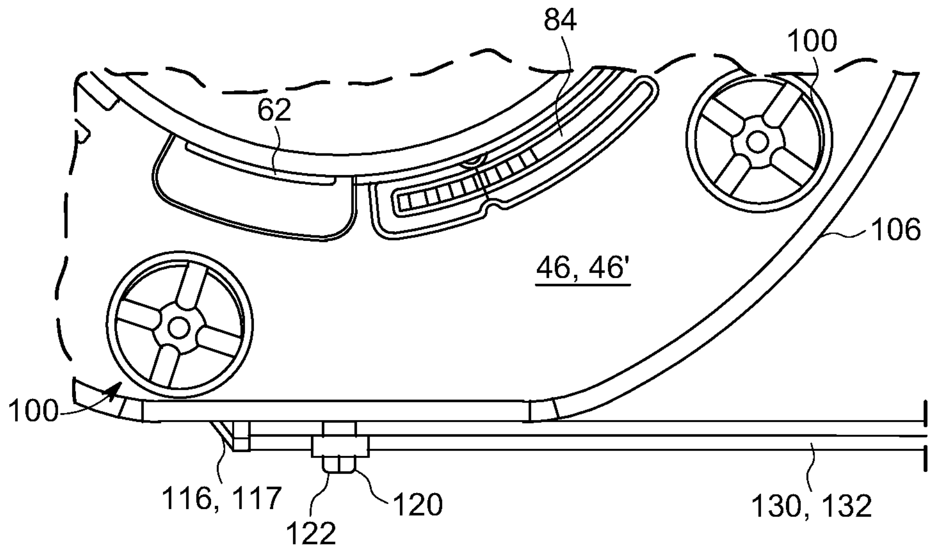
FIG. 7 is detailed top plan view of the area proximate the engagement of a respective one of the connection arms with a respective bulk material bin dolly assembly shown in FIG. 2.

Referring to FIGS. 3 and 4, a radial perimeter edge 106 of each base 46, 46' includes one or more flats or lands 108, 110 formed thereat. A respective post 112, 114 and a respective rib 116, 117 are associated with each land 108, 110 and extend in the outward radial direction relative to the relative radial edge 106 associated with the respective flats 108, 110 of each respective base 46, 46'. Each post 112, 114 includes a slot 122 that allows inward lateral deflection of respective distal end portions 118, 120 of each respective post 112, 114. Referring to FIGS. 2 and 6, transport system 20 includes one or more connection brackets or connection arms 130, 132 that are constructed to cooperate with adjacent bases 46, 46' to secure adjacent dolly assemblies 24, 24' to one another when use of more than one dolly assembly 24 is necessary or desired.

Each connection arm 130, 132 includes a respective opening 134 that is disposed proximate the respective longitudinal or free ends thereof. Each of openings 134 are constructed to cooperate with a respective post 112, 112', 114, 114' associated with adjacent dolly assemblies 24, 24' to provide a secure but removable connection between at least two adjacent bases 46, 46'. Each connection arm 130, 132 selectively removeably cooperates with at least two respective projections, channels, or posts 112, 112', 114, 114' associated with adjacent dolly assemblies 24, 24' so as to effectuate the convenient connection of multiple bases 46, 46' and/or the connection of discrete bases 46, 46' to adjacent structures, such as a janitorial or ancillary food service carts or the like, to effectuate the convenient and concurrent transport of multiple wheeled devices and/or dolly assemblies 24, 24' when desired as shown in FIG. 1. Arms 130, 132 preferably cooperate with corresponding structures associated with the discrete bases 46, 46' in a snap fittingly, press fittable or other interfering engagement that allows the convenient and selective removal of the one or more discrete arms from underlying bases and in a manner that provides an intuitive indicia as to the desired cooperation and removal of the discrete arms from the underlying bases while mitigating or eliminating improper assembly and/or connection of multiple bases.

It is further appreciated that other connection methodologies between arms 130, 132 and discrete bases can be employed. For instance, it is appreciated that one or more of the connections between arms 130, 132 and discrete bases 46, 46' could be provided in a limited slideable or movable methodology such as a pin and pocket or channel association. Such a construction would maintain the desired secure and concurrently moveable interaction between the discrete bases but provide for limited translation therebetween. Such a consideration would improve the ability of the multiple dolly system to tolerate uneven floor surfaces, ramps, and/or thresholds associated with the operating environment without allowing separation between the connected dolly assemblies. Although shown as extending between a pair of discrete bases 46, 46', it is further appreciated that connection arms 130, 132 could be constructed to cooperate with discrete bases 46, 46' so as to extend in crossing or opposite directions from a respective discrete base such that multiple bases in excess of two bases could be operatively selectively secured to one another when such a configuration is desired.

Referring to FIGS. 1 and 3-5A-B, in one embodiment each base 46, 46' includes an optional channel 140 that is constructed to slideably receive an optional projection or bracket 142 associated with supporting an optional actuator, support, or brake assembly 144. As disclosed further below, it is appreciated that optional brake assembly 144 performs various functions aside from braking operations, such as anti-tipping functions as well as allowing securing of the underlying dolly assembly during user interaction with an overlying bin during placement and/or removal of the bins relative to an underlying dolly assembly when desired. Preferably, optional bracket 142 includes a first portion 146 that snap fittingly cooperates with optional channel 140 and a second portion 148 that extends in a downwardly oriented direction toward floor 104. Optional bracket 142 preferably terminates short of contacting floor 104.

Figure 5A:
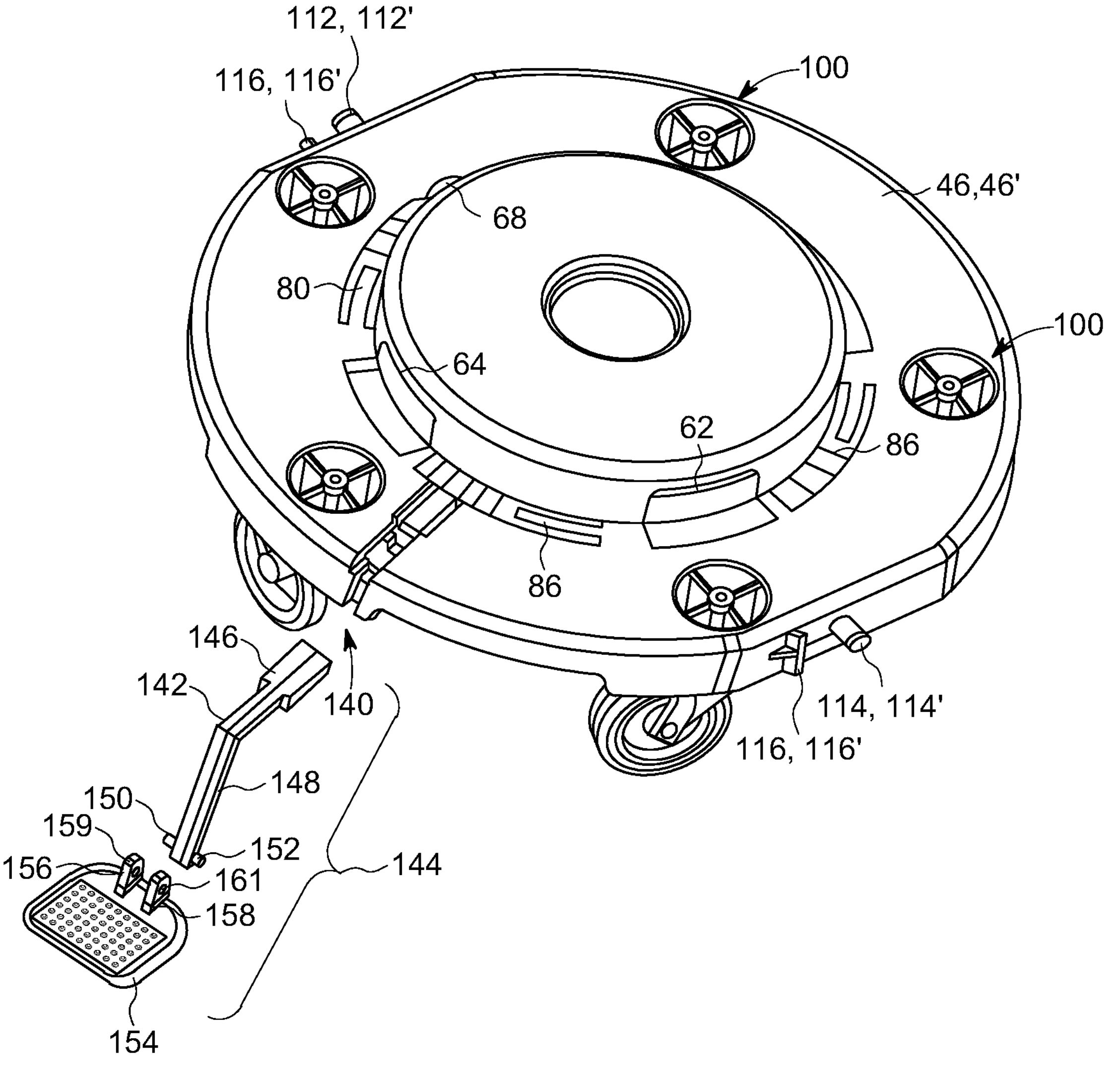
FIG. 5A is a perspective view of the bin dolly assembly shown in FIG. 3 with an optional actuator, support, or brake assembly exploded therefrom.
Figure 5B:
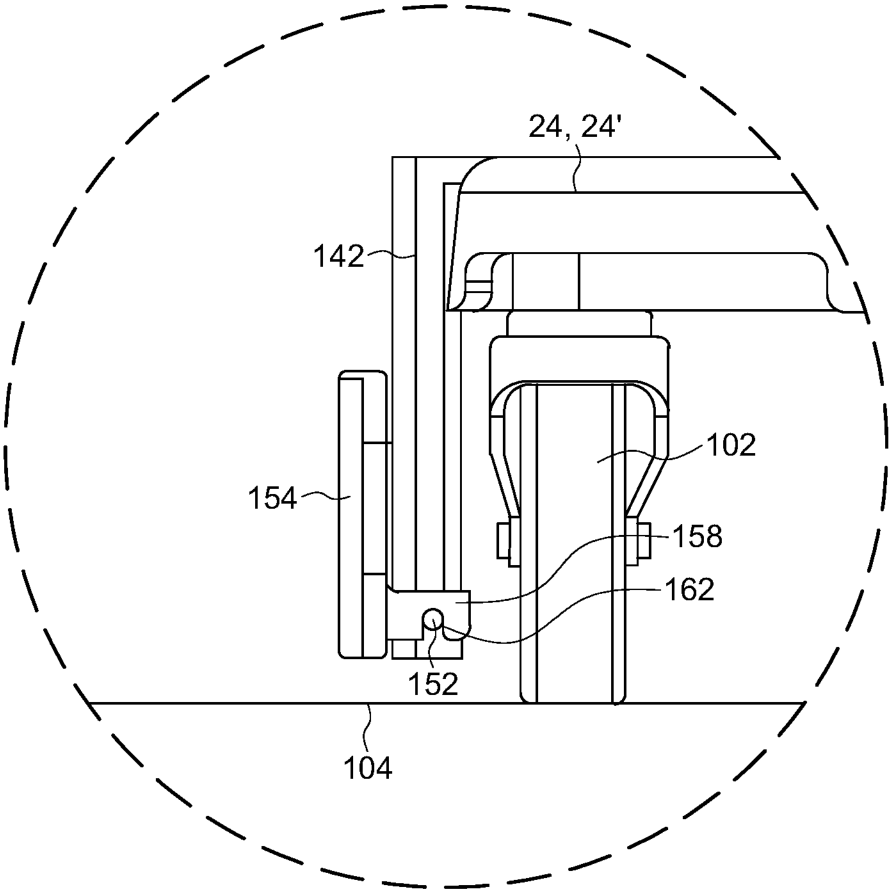
FIG. 5B is a side elevation view of a portion of the bin dolly assembly shown in FIG. 4 proximate the optional brake assembly with the actuator assembly oriented in a stowed position.

A pair of posts 150, 152 extend from opposite lateral sides of downwardly depending portion 148 of optional bracket 142 and are constructed to receive an optional brake or support body 154 thereat. A pair of projections 156, 158 extend from the upwardly directed surface of support body 154 and define respective channels 159, 161 shaped to snap fittingly or otherwise tool-lessly cooperate with respective posts 150, 152 of optional bracket 142 in a manner that allows rotation of support body 154 relative to bracket 142. Said in another way, optional support body 154 is constructed to engage optional bracket 142 so as to be rotatable between a first or stowed position (as shown in FIG. 5B) wherein support body 154 extends along second portion 148 of bracket 142 and an in-use or deployed position (FIGS. 1, 4, and 5A) wherein support body 154 is oriented in close or contacting engagement with floor surface 104. When in the stowed orientation shown in FIG. 5B, the generally upward and inward orientation of optional support body 154 relative to the deployed or in-use orientation, provides sufficient clearance between the support, actuator, or optional brake assembly 144 relative to the floor to as to not interfere with the desired manual translation of the bin and dolly assembly relative to a floor surface.

When in the deployed orientation, optional support body 154 is disposed radially outward relative to a footprint defined by operation of caster wheels 102 and is oriented to be stepped upon by the user so as to thereby secure respective dolly assemblies 24, 24' relative to the underlying floor surface 104 to mitigate translation of one or more of dolly assemblies 24, 24' during user interaction with bin 22 and/or removal or placement of discrete bins relative to the one or more underlying dolly assemblies. That is, when stepped upon, optional support body 154 renders one or more respective dolly assemblies 24, 24' incapable of translation relative to floor surface 104. The radially outward orientation of optional support body 154 relative to the footprint defined by caster wheel assemblies 102 further provides greater tipping resistance associated with user interaction with the transport system 20 and/or the bin 22 associated therewith. As shown in FIGS. 1 and 2, when multiple dolly assemblies 24, 24' are secured to one another via usage of one or more of connection arms 130, 132, discrete optional brake assemblies 144, 144' are oriented toward radially outward directed areas of transport system 20 thereby allowing user interaction with transport system 20 from various locations suitable for user interaction with at least one of optional brake systems 144, 144'.

Figure 8:
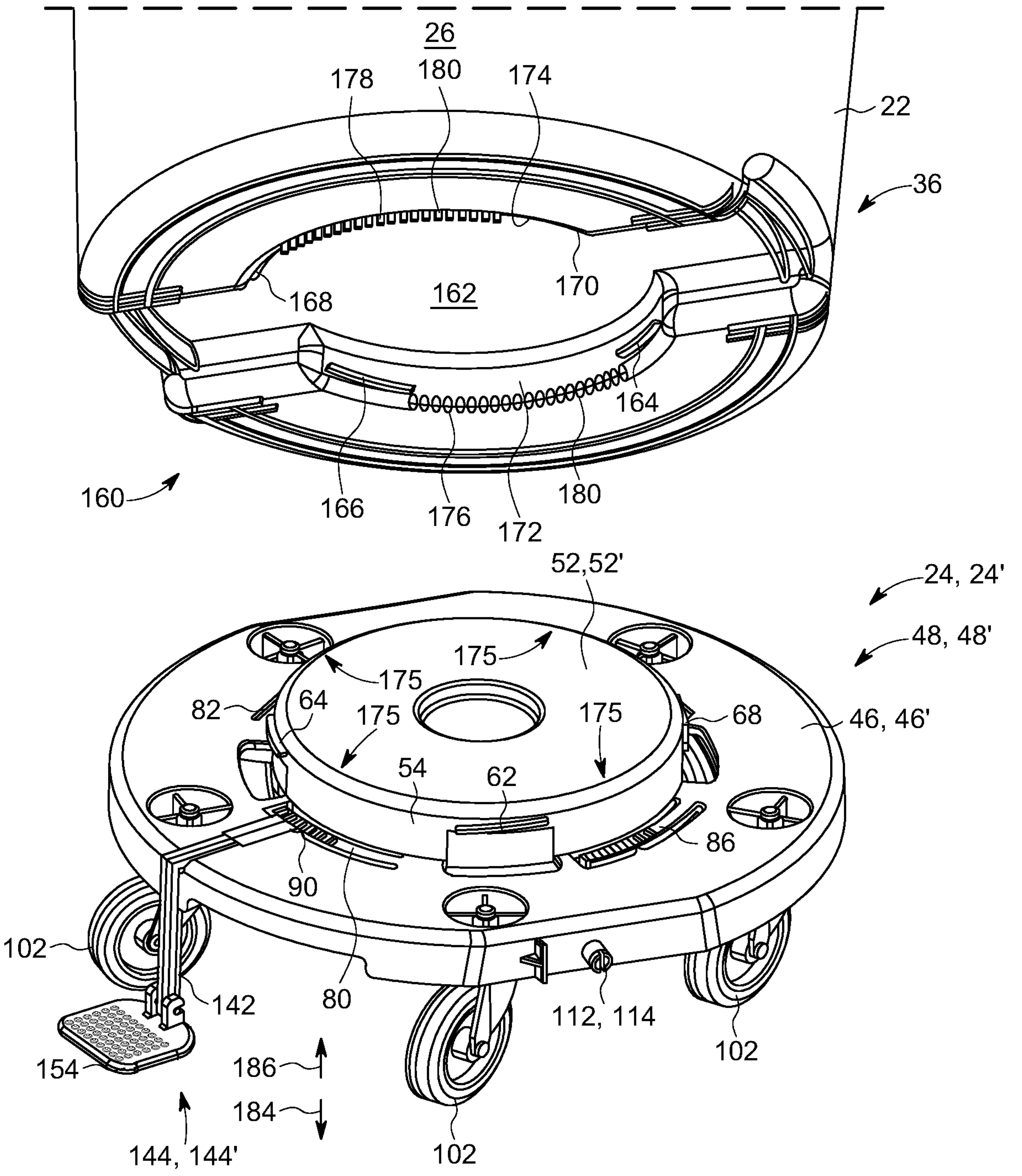
FIG. 8. is a perspective view of one of the dolly assemblies shown in FIG. 1 with the connector brackets removed therefrom and the underside of the exemplary bin exploded therefrom.

Referring to FIG. 8, underside 160 of bin 22 is constructed to removably cooperate with bin facing side 48, 48' of an underlying dolly assembly 24, 24'. Underside 160 of bin 22 includes a blind opening 162 that is shaped to receive boss 52, 52' associated with the underlying dolly assembly 24, 24'. One or more thread portions 164, 166, 168, 170 are formed on respective side walls 172, 174 of bin 22 so as to extend in an inward radial direction relative thereto. A rail or toothed interface 176, 178 that each include a plurality of teeth 180 are formed along the bottom facing or underside 160 of bin 22 and oriented generally radially outboard relative to respective side walls 172, 174 and the respective thread portions 164, 166, 168, 170 defined thereby.

During association of a respective bin 22 with an underlying dolly assembly 24, 24' thread portions 164, 166, 168, 170 are aligned with respective gaps 175 defined in sidewalls 54 of respective bosses 52, 52' and disposed between adjacent thread portions 62, 64, 66, 68 such that the respective thread portions 62, 64, 66, 68 defined by respective dolly assemblies 24, 24' can be oriented axially above the respective planes defined by thread portions 164, 166, 168, 170 defined by respective bin 22 and such that teeth 180 defined by respective rail or toothed interfaces 176, 178 associated with bin 22 interferingly cooperate with teeth 90 of respective catches 80, 82, 84, 86 of the underlying dolly assembly 24, 24'. User rotation of bin 22 in direction 38 (FIG. 1) relative to an underlying dolly assembly 24, 24' allows operative association of each of the respective thread portions 62, 64, 66, 68 of the underlying dolly assembly 24, 24' with a respective clockwise rotationally adjacent thread portion 164, 166, 168, 170 associated with the overlying bin 22. During such rotation, the cantilever construction associated with each of catches 80, 82, 84, 86 allows downward lateral deflection, indicated by arrow 184, of each respective catch 80, 82, 84, 86 such that respective teeth 90 associated with each of catches 80, 82, 84, 86 seat within the space between adjacent teeth 180 associated with respective rail or toothed interfaces 176, 178 of a respective bin 22. The interfering engagement between the teeth 90 associated with respective catches 80, 82, 84, 86 and teeth 180 of the overlying bin 22 act to resist counter clockwise rotational translation, indicated by arrow 40 (FIG. 1) of the respective bin 22 relative to the underlying dolly assembly 24, 24' such that the respective bin 22 is securely engaged therewith in a manner that requires intentional user interaction with the bin and the underlying dolly assembly to effectuate a desired separation therebetween.

The interfering cooperation between thread portion 62, 64, 66, 68 and thread portions 164, 166, 168, 170 of an overlying bin 22 restrict axial translation of bin 22 in an upward direction, indicated by arrow 186, relative to the underlying dolly assembly 24, 24' when bin 22 is engaged therewith. When necessary or desired to separate bin 22 from an underlying dolly assembly 24, 24', user interaction with discrete bases 46, 46', one or more of the discrete caster assemblies associated therewith, and/or with the optional brake assembly 144 and/or stepped upon engagement with optional support body 154, when provided, allows the introduction of a counterclockwise rotational force in direction 40 (FIG. 1) of bin 22 relative to an underlying dolly assembly 24, 24' thereby allowing outward or downward lateral deflection of catches 80, 82, 84, 86 and counterclockwise rotational association of rails 176, 178 therewith until respective thread portions 62, 64, 66, 68 are no longer rotationally aligned with respective thread portions 164, 166, 168, 170 associated with the overlying bin 22 such that bin 22 can be removed or otherwise disengaged from the underlying dolly assembly 24, 24' when necessary or desired.

Figure 9:
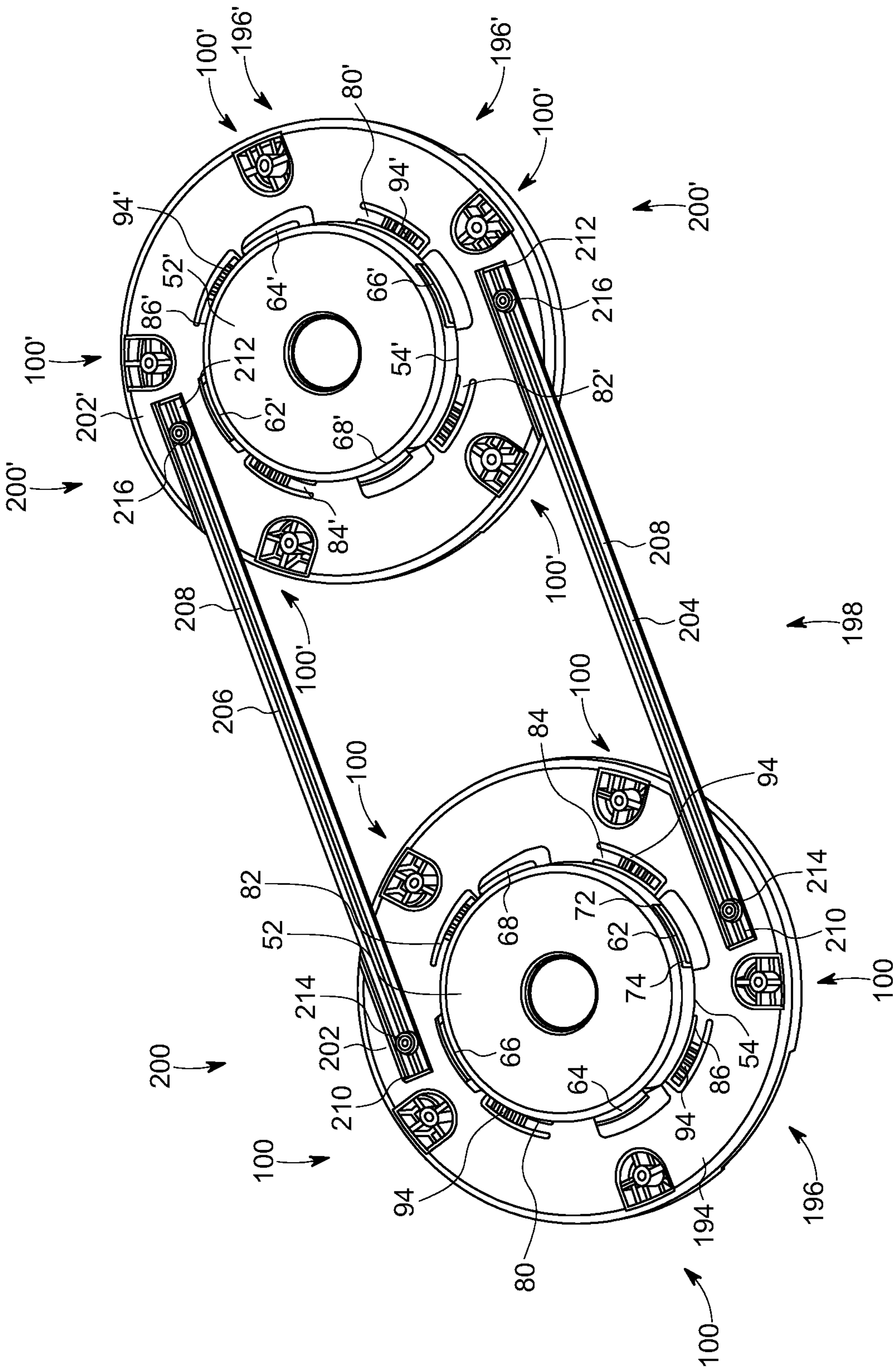
FIG. 9 is a view similar to FIG. 2 of a connected pair of bin dolly assemblies according to another embodiment of the present invention.
Figure 10:
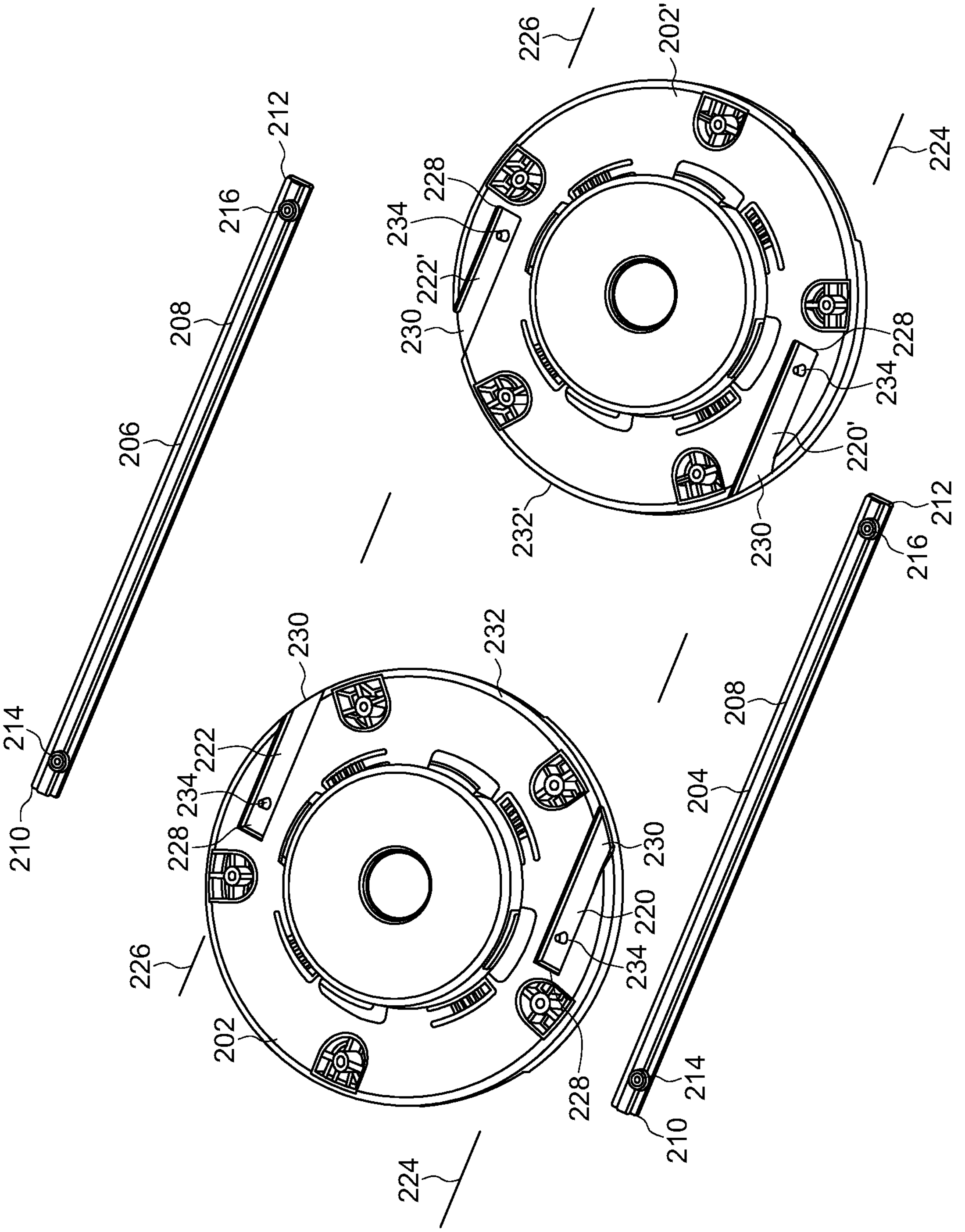
FIG. 10 is a view similar to FIG. 9 with the discrete dolly connector brackets exploded therefrom.

FIGS. 9 and 10 show a pair of discrete dolly assemblies 200, 200' each being defined by discrete bases 202, 202' that are constructed according to another embodiment of the present invention and which define a multiple bin transport assembly 198. For convenience of understanding, similar reference numbers have been used to denote those structures of bases 202, 202' of dolly systems or assemblies 200, 200' that are the same as the construction, operation, and use of dolly systems 24, 24' as disclosed above. Each of dolly assemblies 24, 24', 200, 200' are constructed to cooperate with the underside of bin 22 in the same manner as described above.

That is, the construction of the generally centrally oriented structures of bases 46, 46' are the same as of those same structures associated with bases 202, 202'. The body or base 202, 202' of each dolly assembly 200, 200' defines an upper or bin facing surface 194, 194' and a lower or floor facing surface 196, 196' that each extend along the opposite sides thereof. Bin facing surface 194, 194' includes a projection or a boss 52, 52' that is generally centrally disposed relative to bin facing surface 194, 194'. Boss 52, 52' includes an upstanding wall 54, 54' formed between a perimeter 232, 232' of bin facing surface 194, 194' and a perimeter 58, 58' associated with a top surface 60, 60' of projection 52, 52'. One or more projections or thread portions 62, 64, 66, 68 extend in an outward radial direction from the upstanding wall 54, 54' associated with each respective boss 52, 52'. Although four thread sections or portions are shown, it is appreciated that bosses 52, 52' could be provided with other numbers of thread portions. As disclosed further above with respect to FIG. 8, respective gaps 74, 74' are formed between adjacent respective thread portions 62, 64, 66, 68 and configured to allow axial translation of bin 22 along axis 42 during association and disassociation of bin 22 relative to a respective dolly assembly 200, 200'. Like dolly assembly 24, 24', a respective first end 70 of each respective thread portion 62, 64, 66, 68 is nearer top surface 60 of respective boss 52, 52' than an opposing end 72 of the corresponding thread portion 62, 64, 66, 68 such that, as disclosed above, rotational interaction of bin 22 with thread portions 62, 64, 66, 68 effectuates axial biasing of bin 22 toward a respective underlying dolly assembly 200, 200'. With respect to FIGS. 9 and 10, to improve the visibility of that which is shown therein, no bin 22 is shown engaged with either of bases 202, 202' and the discrete casters have been removed from the discrete bosses 100 defined thereby.

As shown in FIGS. 9 and 10, dolly assemblies 200, 200' omit the optional brake assembly as disclosed above with respect to bases 46, 46' of dolly assemblies 24, 24'. Dolly assemblies 200, 200' do however include one or more base connector arms or connector brackets 204, 206 that are constructed to secure one or more bases 202, 202' relative to one another to effectuate concurrent translation of more than one dolly assembly 200, 200' and/or connection of one or more of dolly assemblies 200, 200' to supplemental devices such as janitorial carts or the like as disclosed above. Each connector bracket 204, 206 is defined by an elongate body 208 that extends between a pair of opposing ends 210, 212. In a preferred embodiment, each connector bracket 204, 206 has a generally T-shaped cross section relative to the elongate axis thereof and a respective opening 214, 216 formed proximate the respective distal or free ends 210, 212 of the respective elongate body 208.

A bin facing side 218, 218' of each base 202, 202' includes a first groove or channel 220, 220' and a second groove or channel 222, 222' that extend along an imaginary secant, indicated by lines 224, 226, that is radially outboard of the respective boss 52, 52' and catches 80, 82, 84, 86; 80', 82', 84', 86' of the respective base 202, 202' so as to not interfere with the selective cooperation of a discrete bin 22 therewith when desired. Each of channels 220, 220', 222, 222' extend from a respective closed end 228 to a respective open end 230 that extends through a perimeter 232, 232' of the respective base 202, 202'. Although generally parallel to one another and oriented such that the respective open ends 230 face in a common direction relative to each discrete base 202, 202', it is appreciated that channels 220, 220', 222, 222' could be oriented to extend in crossing directions relative to one another and/or be constructed to extend between a pair of open ends associated with the perimeter of the discrete base 202, 202' so as facilitate the concurrent connection of more than two bases 202, 202' relative to another and in either of an aligned train-like orientation and/or an orientation wherein the discrete connected bases 202, 202' are oriented at offset relative angles relative to one another.

As shown in FIG. 10, each base 202, 202' includes a projection or post 234 that extends in a generally upward direction from a bottom surface of the respective channel

220, 220', 222, 222'. Although discrete posts 234 are shown as being positioned proximate the respective closed end 228 of the respective channel, it is appreciated that posts 234 may be located at other positions along the longitudinal length of the respective channels. Posts 234 are oriented to removeably cooperate with a respective opening 214, 216 associated with a respective connector bracket 204, 206. Posts 234 and openings 214, 216 can be constructed to snap-fittingly or simply slideably cooperate with one another. It is further appreciated that respective channels 220, 220', 222, 222' and connector brackets 204, 206 may be provided in shapes other than those shown in FIGS. 9 and 10 and/or with or without the interaction between posts 234 and openings 214, 216. For instance, connector brackets and the respective channels could be provided with dove-tail like shaped sections, one or more mating curvilinear sections, and/or other shapes that define respective overlapping shapes and/or sections that limit or inhibit relative longitudinal translation between the connector bracket and the respective bases when the connector bracket and respective channel are associated with one another.

Like connector brackets 130, 132, when respective portions of connector brackets 204, 206 are disposed in respective channels 220, 220', 222, 222', and posts 234 are engaged with respective openings 214, 216 of a respective connector bracket 204, 206, connector brackets 204, 206 extend a distance beyond perimeter 232, 232' of respective bases 202, 202' so as to allow the opposing or respective free end of the respective connector bracket 204, 206 to engage the respective channel 220, 220', 222, 222' and post 234 of an adjacent base 202, 202' and at a distance sufficient to allow discrete bins 22 to be associated and dissociated from either of the respective bases 202, 202' when desired.

Unlike when connector brackets 130, 132 are engaged with bases 46, 46', when connector brackets 204, 206 are engaged with discrete bases 202, 202', and discrete bins 22 are associated therewith, connector brackets 130, 132 are captured in respective portions of channels 220, 220', 222, 222' between the respective base 202, 202' and the underside of the overlying bin 22 associated therewith and prevent inadvertent or unintended disengagement of respective connection brackets 204, 206 from the respective posts 234 and respective channels 220, 220', 222, 222' thereby preventing inadvertent dissociation of connected bases 202, 202'. When dissociating previously connected bases 202, 202', upon removal of an associated bin 22, respective connector brackets 130, 132 can be dissociated from the respective groove 220, 220', 222, 222' such that the respective bases 202, 202' can be independently freely translated relative to one another. It is further appreciated that the generally T-shaped cross section shape of connection brackets 204, 206, the horizontal orientation of the larger cross section dimension associated therewith, and the elongate engagement between connections brackets 204, 206 with the respective opposing upstanding walls defined by respective channels 220, 220', 222, 222' each contribute to providing a robust connection methodology associated with the connection of discrete bases 202, 202' to effectuate concurrent motion thereof via user interaction with a single base 202, 202' and/or a discrete bin 22 associated therewith.

Dolly assemblies 24, 24', 200, 200' each provide a convenient methodology with which respective bulk material bin dollies can be associated and secured to one another and/or secured to other ancillary janitorial equipment, such as kitchen and/or janitorial carts or the like, so that one or more bins 22 can be conveniently and expeditiously associated and dissociated from an underlying dolly assembly 24, 24', 200, 200' when not desired or necessary, provide a bin transport assembly 20, 198 that resists inadvertent, unintended, or unanticipated separation between the respective bin 22 and an underlying dolly assembly 24, 24', 200, 200' and a transport assembly 20, 198 which resists inadvertent, unintended, or unanticipated translation of the respective dolly assemblies 24, 24', 200, 200' and associated bin 22 during user interaction therewith.

Therefore, one embodiment of the invention includes a bulk material bin dolly system or bin dolly assembly that is constructed to removeably cooperate with a bulk material bin to facilitate convenient rolling transport of the bin associated therewith. The dolly system includes a base having a plurality of caster wheels connected thereto. A bin facing side of the base includes a boss and one or more threads that are shaped to index a respective bin relative to the base and, when engaged with one another, restrict axial translation between the bin and the base, respectively. A catch is defined by the base and engages the bin to resist opposite rotational translation between the bin and the base. An optional actuator, pedal, or brake assembly can be connected to the base and is moveable between a stowed position and an engaged position. When in the engaged position, the optional brake assembly resists translation and/or tipping of the assembly relative to a floor surface. In another aspect, the dolly assembly can include a bracket or connector rod that is constructed to secure multiple dollies to one another to facilitate convenient transport of multiple bins.

Another embodiment of the application that is usable or combinable with one or more aspects or features of the above embodiment includes a bulk material bin dolly system having a base that includes an upward facing surface and a floor facing surface. A plurality of caster wheels are engaged with the base and extend away from the floor facing surface of the base. A boss extends from the upward facing surface of the base and at least one thread section extends in a radial direction from a sidewall of the boss. The thread section is constructed to cooperate with a thread section defined by a bin and configured to resist axial translation between the base and the bin when the bin is engaged with the base. At least one catch is defined by the base and is offset in a radial direction from the boss. The at least one catch is constructed to engage a toothed interface defined by the bin when the boss is engaged therewith so that cooperation of the at least catch and the toothed interface resists rotation of the trash bin relative to the base when the bin is engaged therewith.

A further embodiment of the invention that is useable or combinable with one or more of the features or aspects of the above embodiments includes a bin dolly assembly that includes a base having a plurality of caster wheels attached to a floor facing side of the base. A hub extends in an upward direction from a bin facing side of the base. At least one ridge extends in an outward radial direction from the hub such that a first end of the at least one ridge is nearer a top surface of the hub than a second end of the at least one ridge. In one aspect, an optional bracket is secured to a radial edge of the base and extends in a downward direction therefrom and an optional support is connected to a downwardly extending end of the bracket and movably connected thereto such that the optional support can move between a first position wherein the optional support engages a floor and a second position wherein the optional support extends along a portion of the optional bracket that is offset from the floor surface.

Another embodiment of the invention that is usable or combinable with the above embodiments is a method of forming a bulk material bin dolly assembly that includes providing a base and forming a hub on a bin facing side of the base. A partial thread is formed on a radially outward facing side of the hub so that a bin can be removeably engaged with the base and partially rotated in a first direction relative to the base to engage the partial thread to restrict axial movement of the bin relative to the base. A catch is also formed on the base so that the catch can deflect in an axial direction during rotation of the bin relative to the base and resists rotation of the bin in a second direction opposite the second direction.

Various aspects of the invention are described in detail with reference to the drawings, wherein like reference numerals, including use of the "_" numeral designations, represent like parts and assemblies throughout the several views. Reference to one embodiment does not limit the scope of the claims attached hereto. Additionally, any examples set forth in this specification are not intended to be limiting and merely set forth some of the many possible embodiments for the appended claims.

What is claimed is:

1. A bulk material bin dolly system comprising:

a base having by an upward facing surface and a floor facing surface;

a plurality of caster wheels engaged with the base and extending away from the floor facing surface;

a boss extending from the upward facing surface of the base;

at least one thread section that extends in a radial direction from a sidewall of the boss and that is constructed to cooperate with a thread section defined by a bulk material bin and resist axial translation between the base and the bulk material bin when the bulk material bin is engaged with the base; and at least one catch formed as a deflectable toothed rail defined by the base and offset in a radial direction from the boss, the at least one catch being deflectable and constructed to engage a toothed interface defined by the bulk material bin when the boss is engaged therewith so that cooperation of the at least catch and the toothed interface resists rotation of the bulk material bin relative to the base when the bulk material bin is engaged therewith.

2. The bulk material bin dolly system of claim 1 wherein the at least one thread section is further defined as a plurality of thread sections that are spaced circumferentially about the boss.

3. The bulk material bin dolly system of claim 1 wherein the at least one catch is further defined as a plurality of catches that are circumferentially spaced from one another.

4. The bulk material bin dolly system of claim 1 further comprising at least one bracket that is constructed to removably cooperate with the base and secure another base having the same shape as the base to the base in a spaced relation so that another bulk material bin can be engaged with the another base.

5. The bulk material bin dolly system of claim 1 further comprising at least one post defined by the base and constructed to removeably cooperate with a bracket securable to the base.

6. The bulk material bin dolly system of claim 1 further comprising a brake assembly that is secured to the base and includes a pedal that is movable to selectively engage a floor surface engaged by the plurality of caster wheels.

7. A method of forming a material bin dolly assembly, the method comprising:

providing a base;

forming a hub on a bin facing side of the base;

forming a partial thread on a radially outward facing side of the hub so that a material bin can be removeably engaged with the base and partially rotated in a first rotational direction relative to the base to engage the partial thread to restrict axial movement of the material bin relative to the base; and forming a catch on the base so that the catch moves in an axial direction relative to the base during rotation of the material bin relative to the base in the first rotational direction and resists rotation of the material bin relative to the base in a second rotational direction that is opposite the first rotational direction.

8. The method of claim 7 further comprising providing a stop that is movably connected to the base and is moveable between a stowed position wherein the stop is offset from a floor surface and an engaged position wherein the stop engages the floor surface.

9. The method of claim 7 further comprising providing a connection bracket that removeably cooperates with the base such that the connection bracket extends beyond the base and can engage another base to secure the base and the another base to one another.

10. The method of claim 9 further comprising at least one of forming a channel shaped to receive the connection bracket on the bin facing side of the base and forming a flat shaped to cooperate with the connection bracket on a radial perimeter of the base.

11. The method of claim 7 further comprising forming the partial thread so that rotation of the material bin relative to the base in the first direction biases the material bin relative to the base in a direction aligned with deflection of the catch.

12. A method of forming a material bin dolly assembly, the method comprising:

providing a base;

forming a hub on a bin facing side of the base;

forming a partial thread on a radially outward facing side of the hub so that a material bin can be removeably engaged with the base and partially rotated in a first rotational direction relative to the base to engage the partial thread to restrict axial movement of the material bin relative to the base;

forming a catch on the base so that the catch can deflect in an axial direction during rotation of the material bin relative to the base in the first rotational direction and resists rotation of the material bin relative to the base in a second rotational direction that is opposite the first rotational direction;

providing a connection bracket that removeably cooperates with the base such that the connection bracket extends beyond the base and can engage another base to secure the base and the another base to one another; and at least one of forming a channel shaped to receive the connection bracket on the bin facing side of the base and forming a flat shaped to cooperate with the connection bracket on a radial perimeter of the base.

13. A method of forming a material bin dolly assembly, the method comprising:

providing a base;

forming a hub on a bin facing side of the base;

forming a partial thread on a radially outward facing side of the hub so that a material bin can be removeably engaged with the base and partially rotated in a first rotational direction relative to the base to engage the partial thread to restrict axial movement of the material bin relative to the base;

forming a catch on the base so that the catch can deflect in an axial direction during rotation of the material bin relative to the base in the first rotational direction and resists rotation of the material bin relative to the base in a second rotational direction that is opposite the first rotational direction; and forming the partial thread so that rotation of the material bin relative to the base in the first direction biases the material bin relative to the base in a direction aligned with deflection of the catch.

* * * * *